Patented Oct. 6, 1953

2,654,680

UNITED STATES PATENT OFFICE 2,654,680

METHOD FOR INCREASING STABILITY OF RUBBERY POLYMER REACTION PRODUCTS AND RESULTING COMPOSITIONS

Johan Michael Goppel, Gottfried Ernst Rumscheidt, and Johannes Thomas Hackmann, Amsterdam, Netherlands, assignors to Shell Development Company, San Francisco, Calif., a corporation of Delaware No Drawing. Application April 26, 1949, Serial No. 89,802. In the Netherlands May 18, 1948

13 Claims. (Cl. 117—138.8)

1

This invention is directed to a process for the stabilization of products formed on reacting inorganic acidifying compounds with rubbery polymers comprising high molecular weight, polyunsaturated compounds. The invention also relates to the resulting stabilized reaction products.

The term "high molecular weight, polyunsaturated compound," as employed herein, embraces those compounds having a molecular weight of at least 5,000 and which contain a plurality of unsaturated linkages in the molecule. These compounds are either polymers of organic compounds containing a plurality of unsaturated linkages in the molecule, or are copolymers of such multiple-unsaturated compounds with other unsaturated organic compounds of one type or another. The term includes the various natural rubbers such as latex, crepe, sheet, caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Representative copolymers of high molecular weight which come within the term are those formed from butadiene, its homologues and derivatives, with other unsaturated organic compounds. Among the latter are the acetylenes, as vinyl acetylene, the olefins, as isobutylene which copolymerizes with butadiene to form Butyl synthetic rubber; the vinyls, as vinyl chloride, acrylic acid, acrylonitrile (which polymerizes with butadiene to form the synthetic rubber Buna-N), methacrylic acid, and styrene, the latter compound polymerizing with butadiene to form the synthetic rubber Buna S; as well as the vinyl esters and various unsaturated aldehydes, ketones and ethers, e. g., acrolein, methyl isopropenyl ketone, and vinyl ethyl ether. The above-defined, polyunsaturated, high molecular weight compounds, including both natural and synthetic rubbers, may properly be termed "high molecular weight polymers of diene-hydrocarbons," or preferably, "rubbery polymers of at least one compound selected from the group consisting of the conjugated diolefines and chloroprene."

As employed herein, the term "inorganic acidifying compound" embraces the various inorganic acids and acid anhydrides wherein the acid-forming element (as sulfur, nitrogen or phosphorus, for example), if possessing several valencies, is present, in a valency other than the highest

2 thereof. Preferred acidifying compounds are the acid anhydrides, sulfur dioxide, phosphorus trioxide and nitrous trioxide, as well as the acids formed from these anhydrides. Other useful acidifying compounds are hydrogen sulfide, hydrochloric acid, hydrobromic acid, hydroiodic acid, and hydrofluoric acid. The term does not include such compounds as sulfur trioxide, phosphorus pentoxide, nitrogen pentoxide, or their corresponding acids, for in all these compounds the acid-forming element, which is here either sulfur, phosphorus or nitrogen, is present in the highest of several possible valencies. Of the various acidifying compounds set forth herein, the most preferred compound for employment in the present invention is sulfur dioxide.

It is known that the high molecular weight polyunsaturated compounds lend themselves well to the production of various shapes, including those of a continuous, non-supported nature, as filaments, rods, strips, sheets, and the like. Furthermore, it is known that the properties of such shapes may be improved by reacting the unsaturated, high molecular weight compound with one or more of the inorganic acidifying compounds mentioned above, particularly sulfur dioxide. The exact nature of this reaction is not clearly understood, though it is evident that a quantity of the acidifying ingredient is taken up in one form or another by the high molecular weight reactant. The extent of this reaction is normally measured by, and expressed in terms of, the amount of acid-forming element (sulfur, phosphorus or nitrogen, for example) present in the resulting reaction product.

It has also been possible to improve the nature of the foregoing reaction products by incorporating therein, normally prior to the reaction with sulfur dioxide or other acidifying ingredient, a quantity of a low molecular weight, unsaturated compound. The resulting reaction product has a number of advantages, chief among which is a greatly improved acceptance for all the commonly employed dyestuffs. Representative unsaturated compounds which may be employed in this manner, all of which have a molecular weight of below 5,000 are alkadienes such as butadiene and 1,5-hexadiene; and alkenyl compounds such as allyl alcohol, allyl chloride, allyl acetate, allyl capronate, allyl isothiocyanate, allyl oleate, and more especially, diallyl compounds such as diallyl phthalate and diallyl adipate. The method by which unsaturated reactants of both high and low molecular weight are utilized in forming reaction products with acidifying compounds forms the subject of copending application, Serial No. 15,048, filed March 15, 1948, and reference is hereby made to said application for a more complete description of the invention there disclosed.

It should be noted that while the high molecular weight, polyunsaturated compounds, or mixtures of both high as well as low molecular weight unsaturated compounds, may be reacted with the acidfying compound without prior modification of either reactant, improved results are obtained when the unsaturated compounds are first activated by treatment with a hydroperoxide such as decalin hydroperoxide, tetralin hydroperoxide, or ethyl benzene hydroperoxide. Activation methods of this nature are disclosed in copending applications, Serial Nos. 760,924, filed July 14, 1947, and 788,312, filed November 26, 1947, now Patent No. 2,558,498, to which applications reference is here made. The peroxide treatment is also disclosed in copending application Serial No. 15,048, referred to above, as said activation treatment relates to mixtures of high and low molecular weight unsaturated reactants.

While the reaction products discussed above have proven well adapted for many uses, they have proven particularly useful when formed into filaments of the type which can be woven into textiles, either alone or in conjunction with fibers of other materials. Thus, filaments produced by spinning a peroxide-activated rubber solution into a sulfur dioxide-containing coagulating bath have a high elementary denier, with good tensile strength, a relatively high degree of elongation prior to rupture, and good flexibility and other characteristics making for ease of working and handling. In view of these many favorable qualities, it has been highly disappointing to realize that even in the case of the best reaction products hitherto obtainable, deterioration of the filament or other shape with age, heating and/or exposure to ultra-violet light is unduly rapid. This deterioration is manifested in a variety of ways, but chiefly in a sharp falling off in tensile strength and in the degree of permissible stretch prior to rupture. In many instances undesirable color changes also ensue. These various changes are greatly speeded up as the objects under consideration are heated, particularly above 100° C., or are exposed to ultra-violet or other light rays. It has been observed that the deterioration in physical properties is attended by a loss of sulfur dioxide or equivalent acid constituent from the reaction product, a loss which is generally proportional to the aforementioned deterioration. Accordingly, the rapidity with which a given product loses its acid constituent may also be taken as a measure of its stability, i. e., its resistance to deterioration with age, heating, and/or exposure to ultra-violet light.

It is an object of the present invention to provide a method for obtaining stable products of the type formed on the reaction of high molecular weight, polyunsaturated compounds with inorganic acidifying compounds.

A more particular object is to provide filaments and like continuous, non-supported shapes composed of reaction products of the type discussed above, yet which are highly stable and are characterized by a continued high tensile strength and high degree of stretch prior to rupture, as well as by a relatively small loss of acidifying compound, when said filaments or shapes are aged, heated and/or exposed to light rays.

The nature of still other objects will become apparent from the following description of the invention.

It has been discovered that excellent resistance to deterioration with age, heat and/or exposure to ultra-violet and other light rays may be imparted to objects composed of the product formed on reacting high molecular weight, polyunsaturated compounds with inorganic acidifying compounds by incorporating in said objects a nitrogen-containing organic compound wherein a nitrogen atom is attached to a carbon atom which in turn is linked by a double bond to an oxygen, sulfur or nitrogen atom which does not form a part of a ring. The nitrogenous additives of the present invention are within the scope of the group consisting of carbamyl-substituted hydrocarbons, such as acetamide, stearamide, benzamide, acetanilide, n-valeramide, propionamide, n-caproamide, lauramide, N-methylacetamide, o-methylacetanilide, N-ethylbenzamide and N-phenylbenzamide; guanyl-substituted cyanamides and guanyl-substituted hydrocarbons, such as ethylamidine, acetamidine, cetylamidine and dicyandiamide (also known as cyanoguanidine); urethanes such as urethane, acetylurethane, hedonal, ethylurethane, and their corresponding thiourethane derivatives; dihydrocarbon-substituted carbodiimides such as diphenylcarbodiimide, diallylcarbodiimide and p,p'-dimethyldiamino-diphenylcarbodiimide; and thiamides of carbodithioic acids such as zinc dimethyldithiocarbamate and thiuram disulfide. Of these various additives, the preferred compound for use in the present invention is dicyandiamide.

It also forms a feature of the present invention to stabilize the above-described reaction products with both a nitrogenous additive of the type described in the preceding paragraph, as well as a compound of the type having the general formula:

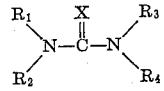

wherein X is an oxygen or sulfur atom or the imine (NH) group, and $R_1$, $R_2$, $R_3$, $R_4$ represent hydrogen atoms, hydrocarbon radicals or polar-substituted hydrocarbon radicals. Compounds of this class, representative members of which are urea, thiourea, guanidine, N,N- and N,N'-diphenyl thiourea, and N,N- and N,N'-diphenyl thiourea and N,N- and N,N'-diphenyl quanidine, are disclosed in our co-pending application, Serial No. 37,056, filed July 3, 1948, now Patent No. 2,583,370, as useful stabilizers for the reaction products discussed above. When additives of the foregoing types are employed in conjunction with one another in sulfur dioxide-rubbery polymer reaction products, there is observed not only an improved stability in the treated reaction products, but also an improvement in the ability of the latter to retain their improved stability under adverse environmental conditions. A preferred combination is that of dicyandiamide with either urea or thiourea.

The stabilizer chosen, which, as noted above, may be one or a mixture of several compounds, can be incorporated in the reaction product in one or more of a number of different ways. Thus, for example, the stabilizer may be added to the solution of rubber or other polyunsaturated high molecular weight reactant before the same is brought into reactive engagement with the sulfur dioxide or other acidifying compound employed; alternatively, it may be added to the medium containing the acidifying compound. The practice of either of the foregoing methods requires that the stabilizer be soluble or at least dispersible in the liquid medium present, and preferably it should in no way interfere with the desired reaction between the respective unsaturated and acidic compounds. Since some such interference may occur, particularly as the concentration of stabilizer is increased or the more alkaline stabilizers are employed, the preferred manner of adding the stabilizer is to bring a solution thereof into contact with the already formed reaction product, preferably when the latter is still in the swollen condition due to its manner of production in the coagulating bath and/or as a result of subsequent washing steps. Thus, filaments produced by spinning a solution of peroxide activated rubber into an ethanol-water-sulfur dioxide coagulating bath may thereafter be immersed in a solution of a stabilizer, as dicyandiamide in water and/or ethanol, for example, and left therein for any desired period of time. Other appropriate solvents are acetone, propanol, butanol and methyl ethyl ketone. On being withdrawn from the stabilizer solution, the filaments may then be washed in the conventional manner (as with alcohol, water, dilute caustic or other liquid), stretched, dyed, or otherwise treated, following which they may be dried and used. If desired, one or more of such washing, stretching and/or dyeing steps may intervene between the actual precipitation of the filaments in the coagulating bath and their immersion in the stabilizer solution, the filaments preferably remaining in the swollen condition during all said processing steps. Alternatively, the filaments may be treated in the dried (unswollen) condition with a solution of the desired stabilizing compound, preferably in a solvent such as benzene, ethyl alcohol, acetone or ethyl acetate which acts to swell the filament, though non-filament swelling solvents such as water may be employed in many cases. The stabilizers may also be applied on or in the material to be stabilized otherwise than by impregnation. Thus, the material may be contacted with dispersions of stabilizers or with an atmosphere which contains the stabilizers in the vaporous or atomized state. In the latter case a solution of the stabilizer may be atomized, if desired.

The concentration of stabilizer to employ, whether the same be added to the unreacted materials, or is applied as a solution to the already formed reaction product, is not critical. Thus, good results are obtained with solutions containing from about 0.1 to 20% by weight of a stabilizer, and some improvement can be effected even when using smaller quantities than 0.1%, particularly when more than one stabilizer be employed. Preferably, however, the concentration of stabilizer should be at least 0.5% based on the entire weight of the solution, with concentrations of more than 10% seldom being justified in terms of improved results.

The period during which any given reaction product should be left in a stabilizer solution will vary depending on a number of circumstances. Thus, in the case of filaments and other small shapes the soaking period may be somewhat shorter than with articles of greater cross section. Again, with more concentrated stabilizer solutions the soaking period may be somewhat shortened. Another factor is the ease with which the reaction product is able to take up the stabilizer solution; thus, freshly formed, undried products (e. g., swollen filaments) are considerably more receptive to the stabilizer solution than are objects which have already been dried and now must take up fresh quantities of solvent along with the dissolved stabilizer. In general, immersion periods of from 1 to 30 minutes are satisfactory with swollen filaments, though soaking periods of one or more hours are desirable when treating dried filaments. In all cases extension of the soaking time is in no way harmful and in many cases proves of considerable benefit. Where the stabilizer is added to the unreacted solution of rubber or sulfur dioxide, for example, no modification need be made in the normal process by which said compounds are reacted.

Of more importance than the duration of the treatment with stabilizer solution is the temperature thereof. It forms a feature of the present invention that improved results are obtained by employing a heated stabilizer solution, by which term is meant a solution having a temperature of 50° C. or above, and preferably between 50 and 150° C. The use of such heated solutions serves in a measure to fix the stabilizer in the reaction product, thereby increasing its resistance to removal during aging, or as a result of subsequent washing or other treating steps.

Still further improved results, notably as regards increased stability and resistance against age-deterioration following soap-washing and/or alkali-treating steps, are achieved by subjecting reaction products already impregnated with stabilizer compound to a treatment involving heating said products in a gaseous environment such as air or nitrogen. The temperatures employed in this heating step may range from about 50 to 250° C., though temperatures of from 80 to 150° C. are preferred. Effective treatments carried out in the latter temperature range normally take from ½ to 4 or more hours, the relatively higher temperatures permitting effective use of the shorter treating intervals. This dry heating step may be practiced with beneficial results no matter whether the impregnation treatment referred to in the preceding paragraph be conducted at elevated temperatures or not, though as a general rule the one heating treatment re-enforces the other.

It has also been found that improved results as regards fixation of stabilizer may be obtained by utilizing a stabilizer compound such as diallyl carbodiimide which contains one or more alkenyl or other unsaturated, aliphatic groups. Such unsaturated stabilizing compounds are preferably introduced into a solution of rubber or other high molecular weight reactant prior to its reaction with the acidic compound if the full effect of the stabilization treatment is to be obtained, for it seems quite probable that under these circumstances the stabilizer enters into, and chemically forms a part of, the final reaction product.

Still a third way of improving the bond between the reaction product and the stabilizer is to treat the already stabilized product with an aldehyde or isocyanate, the stabilizer present in the product reacting with the aldehyde or isocyanate under these circumstances to form condensation or poly-addition compounds, either of which are of such a character as to be washed out of the product only with the greatest diffi- The following examples illustrate the present invention in various of its embodiments:

EXAMPLE I

The material to be stabilized was a reaction product of natural rubber with sulfur dioxide in the form of dried filaments having a sulfur content of 22% by weight, which material was produced by spinning a solution of natural rubber and tetralin hydroperoxide into a sulfur dioxide-containing coagulating bath, and thereafter stretching, washing, and drying the filaments in air at room temperature. Samples of these dried filaments were soaked in solutions of various stabilizers or combinations of stabilizers for 4 hours, after which they were cursorily rinsed with ethanol and dried in the open air, the concentration and temperature of the various stabilizer solutions, as well as their identity, being indicated in Table I below. The stability of the samples was determined by measuring the quantity of sulfur dioxide liberated per unit of weight of the material on heating the same for two hours at 125° C. in an air current. In the case of those tests reported in Table I, this loss of sulfur dioxide is expressed as the percentage of the quantity thereof lost in a blank test, i. e., with like filaments containing no stabilizer. As a matter of record, the actual quantity of sulfur dioxide split off from the various samples during each two hour heating test period varied from about 1.5 to 3% by weight of the entire sample, this corresponding to loss in tensile strength of from 9 to 18%.

*Table I*

| Stabilizer | Impregnation Bath | | | SO₂ liberated on heating |
|---|---|---|---|---|
| | Solvent | Conc. in percent | Temp., °C. | |
| None | | | | 100 |
| 1. Zinc dimethyldithiocarbamate | ethanol | 0.5 | 20 | 36 |
| 2. Acetamide | do | 2 | 20 | 40 |
| 3. P,p'-dimethyldiaminodiphenylcarbodiimide | do | 2 | 20 | 10 |
| 4. Dicyandiamide | do | 2 | 20 | 9 |
| 5. Tetramethylthiuramdisulfide | ethanol acetone 1:1 | 2 | 20 | 40 |

EXAMPLE II

The stabilization operations summarized in Example I above involved soaking the dried filaments for 4 hours in the desired stabilizer solution. On repeating the soaking experiments with freshly prepared, swollen filaments it is found that equivalent results as regards freedom from loss of sulfur dioxide and general stability in the finally dried filaments are obtained by soaking the filaments in stabilizer solutions for periods of from 1 to 15 minutes.

EXAMPLE III

This example illustrates the advantages achieved by soaking the unstabilized filaments in hot solutions of the desired stabilizer compounds. In this case one lot of filaments of the kind described in Example I above was immersed for a period of 4 hours in a 2% solution of dicyandiamide maintained at 20° C., whereas another lot of the filaments was soaked in a similar solution maintained at 78° C. On being dried at room temperature and then heated in air at 125° C., those filaments soaked at 20° C. lost 0.14% by weight sulfur dioxide at the end of the first 30 minutes of heating, 0.22% after 60 minutes, and 0.28% after 90 minutes. In the case of the filaments soaked at 78° C., this loss was reduced to 0.10% at the end of the first 30 minutes of heating, and 0.16% and 0.22% at the end of 60 and 90 minute heating periods, respectively.

The above filaments, on being washed for four hours at 60° C. with a 0.4% soap solution, suffer an increase in the amount of sulfur dioxide lost in subsequent heating steps, though this increase is not as great in the case of the filaments stabilized at 78° C., as it is with those which were treated at 28° C. In both cases, however, this increased sulfur dioxide loss following washing has been greatly minimized by subjecting the stabilizer containing filaments to treatment in an air current at 125° C. for periods of from one to two hours. The air treatment apparently acts to physically modify the filaments in a manner yet not understood, but it evidently prevents the physical removal of the stabilizer compounds by the soap or other wash liquids.

EXAMPLE IV

Synthetic rubber filaments containing approximately 20% sulfur dioxide were produced by spinning a solution of butadiene polymer (molecular weight approximately 50,000) activated with tetralin hydroperoxide into an ethanol-water coagulating bath containing dissolved sulfur dioxide. One lot of these filaments was stabilized by soaking in an ethanol solution containing 2% by weight of dicyandiamide at 20° C. for a period of four hours whereas the other group was soaked in ethanol only. On drying both sets of filaments it was found that those impregnated with dicyandiamide had a resistance against thermal deterioration which was approximately five times as great as that of the unstabilized filaments.

The invention claimed is:

1. The method of increasing the resistance to deterioration of a product formed on the reaction of natural rubber with sulfur dioxide, said method comprising impregnating said product with a solution of dicyandiamide.

2. The method of increasing the resistance to deterioration of a product formed on the reaction of natural rubber with sulfur dioxide, said method comprising immersing said product in a heated solution of dicyandiamide.

3. The method of increasing the resistance to deterioration with age of a product formed on the reaction of natural rubber with sulfur dioxide, said method comprising impregnating said product with a solution of dicyandiamide and thereafter heating the product in a gaseous environment.

4. The method of claim 2 wherein there is added the step of heating the impregnated product in a gaseous environment.

5. The method of increasing the resistance to deterioration of a product formed on the reaction of sulfur dioxide with a rubbery polymer of at least one compound selected from the group consisting of conjugated diolefins and chloroprene, in the presence of a peroxide activating agent, these being the only reactants, said method comprising impregnating said product, while it is in a coagulated state and swollen with solvent, with a solution of a stabilizer selected from the group consisting of guanyl-substituted cyanamides, guanyl-substituted hydrocarbons, and di-hydrocarbon-substituted carbodiimides.

6. The method of claim 5 wherein the stabilizer is incorporated in said product by immersing the latter in a heated solution of the stabilizer.

7. The method of claim 5 wherein there is added the step of heating the stabilizer-containing product in a gaseous environment.

8. In a method wherein a solution containing a hydroperoxide and a rubbery polymer of at least one compound selected from the group consisting of conjugated diolefins and chloroprene is spun into a coagulating bath containing available sulfur dioxide, these being the only reactants, whereby there is precipitated in the bath a filamentary reaction product of the rubbery polymer and sulfur dioxide in the form of a continuous swollen filament which is then withdrawn from the coagulating bath, the step comprising impregnating the still swollen filament with a solution of a stabilizer selected from the group consisting of guanyl-substituted cyanamides, guanyl-substituted hydrocarbons and di-hydrocarbon-substituted carbodiimides.

9. A novel composition of matter comprising a reaction product of sulfur dioxide with a rubbery polymer of at least one compound selected from the group consisting of conjugated diolefins and chloroprene, these being the only reactants, which reaction product is impregnated with a stabilizer selected from the group consisting of guanyl-substituted cyanamides, guanyl-substituted hydrocarbons and di-hydrocarbon-substituted carbodiimides.

10. A novel composition of matter comprising a reaction product of sulfur dioxide with a rubbery polymer of at least one compound selected from the group consisting of conjugated diolefins and chloroprene, these being the only reactants, which reaction product is impregnated with dicyandiamide, as a stabilizer.

11. In a method wherein a solution containing a hydroperoxide and natural rubber is spun into a coagulating bath containing available sulfur dioxide, these being the only reactants, whereby there is precipitated in the bath a filamentary reaction product of the rubber and sulfur dioxide in the form of a continuous swollen filament which is then withdrawn from the coagulating bath, the step comprising impregnating the still swollen filament with a solution of a stabilizer selected from the group consisting of guanyl-substituted cyanamides, guanyl-substituted hydrocarbons and di-hydrocarbon-substituted carbodiimides.

12. A novel composition of matter comprising a reaction product of sulfur dioxide with natural rubber, these being the only reactants, which reaction product is impregnated with dicyandiamide, as a stabilizer.

13. The method of increasing the resistance to deterioration of a product formed on the reaction of sulfur dioxide with natural rubber, these being the only reactants, said method comprising impregnating said product while it is in a coagulated state and swollen with solvent, with a solution of a stabilizer selected from the group consisting of guanyl-substituted cyanamides, guanyl-substituted carbodiimides.

JOHAN MICHAEL GOPPEL.
GOTTFRIED ERNST RUMSCHEIDT.
JOHANNES THOMAS HACKMANN.

References Cited in the file of this patent

UNITED STATES PATENTS

| Number | Name | Date |
| --- | --- | --- |
| 2,367,483 | Cheyney | Jan. 16, 1945 |
| 2,379,354 | Hilton | June 26, 1945 |
| 2,387,518 | Lightbown | Oct. 23, 1945 |
| 2,469,847 | Rumscheidt | May 10, 1949 |
| 2,583,370 | Goppel et al. | Jan. 22, 1952 |

FOREIGN PATENTS

| Number | Country | Date |
| --- | --- | --- |
| 593,036 | Great Britain | Oct. 7, 1947 |